United States Patent [19]

Schneider et al.

[11] 4,070,310
[45] Jan. 24, 1978

[54] PROCESS FOR THE PRODUCTION OF FOAMS

[75] Inventors: Heinz-Georg Schneider, Dieringhausen; Helmut Kleimann; Bruno Luckas, both of Leverkusen, all of Germany

[73] Assignee: Bayer Aktiengesellschaft, Leverkusen, Germany

[21] Appl. No.: 691,057

[22] Filed: May 28, 1976

[30] Foreign Application Priority Data

June 4, 1975 Germany .............................. 2524834

[51] Int. Cl.² .............................................. C08G 18/14
[52] U.S. Cl. ...................... 260/2.5 BD; 260/2.5 AE; 260/2.5 AW; 260/2.5 AZ
[58] Field of Search .................... 260/2.5 AZ, 2.5 AE, 260/2.5 AW, 2.5 BD

[56] References Cited

U.S. PATENT DOCUMENTS

| | | | |
|---|---|---|---|
| 3,074,894 | 1/1963 | Loew et al. | 260/2.5 AM |
| 3,222,302 | 12/1965 | Bollert et al. | 260/2.5 N |
| 3,242,108 | 3/1966 | McGary, Jr. et al. | 260/2.5 AE |
| 3,505,137 | 4/1970 | Kliene | 260/2.5 AZ |
| 3,573,232 | 3/1971 | Kloker et al. | 260/22 CB |
| 3,608,008 | 9/1971 | Soukup | 260/2.5 AZ |
| 3,666,848 | 5/1972 | Harper | 260/2.5 AZ |
| 3,849,349 | 11/1974 | Frisch et al. | 260/2.5 AZ |
| 3,993,606 | 11/1976 | von Bonin et al. | 260/2.5 AC |

*Primary Examiner*—Eugene C. Rzucidlo
*Attorney, Agent, or Firm*—Gene Harsh; Joseph C. Gil

[57] ABSTRACT

This invention relates to a process for the production of polyurethane foams in closed molds using mixtures of organic polyisocyanates with certain compounds which liberate carbon dioxide under the catalytic influence of basic compounds. In this process a mixture of polyisocyanates and compounds which liberate carbon dioxide under the catalytic influence of basic compounds is reacted with organic compounds containing hydrogen atoms which are reactive with isocyanate groups, which organic compounds are mixed with basic compounds and/or have basic compounds chemically built into them. The process is suitable for the production of any polyurethane foams in a closed mold, but is preferably applied to the production of semi-hard and particularly of hard polyurethane foams having a dense outer skin.

6 Claims, No Drawings

PROCESS FOR THE PRODUCTION OF FOAMS

BACKGROUND OF THE INVENTION

The production of molded polyurethane foam products having a compact surface by foaming inside molds is known in principle (for example, German Auslegeschrift No. 1,196,864). It may be carried out, for example, by introducing a reactive and foamable mixture based on compounds containing several hydrogen atoms which are reactive with isocyanate groups and polyisocyanates into a closed mold. The blowing agents used in the processes known in the art are water and/or fluorinated hydrocarbons. Catalysts of the type known for the production of polyurethane foams are also generally used. By suitable choice of the starting components, in particular the choice of the molecular weight and functionality of the components from which the foam is obtained, it is possible to obtain either elastic or rigid foams or any variations between these two types. The dense outer skin is obtained in this process by introducing into the mold a larger quantity of foamable mixture than would be required for completely filling the mold under conditions of unrestricted foaming. The internal wall of the mold generally cools the reaction mixture in contact with it and causes condensation of the organic blowing agent which is preferably used, with the result that the expanding reaction comes to a standstill in the region of the internal wall of the mold so that a compact outer skin is formed. When employing this known method, it was often observed that the viscosity of the foaming reaction mixture increased too rapidly before completion of the foaming process so that the mold did not become completely filled. Another disadvantage of the known process was that the density was not homogenously distributed in the resulting molded foam product. If the reaction mixture foamed vertically in a mold, the density of the foam in the higher part of the mold was much lower than in the lower part of the mold. This is also due to a too rapid increase in the viscosity before termination of the foaming process.

DESCRIPTION OF THE INVENTION

It has now surprisingly been found that these disadvantages in the known processes may to a large extent be obviated if certain compounds which will be described in more detail below and which liberate carbon dioxide in the presence of basic compounds are added to the known foamable mixtures together with the appropriate basic compounds to bring about this evolution of carbon dioxide.

The present invention has as one of its objects a process for the closed mold production of polyurethane foams by foaming a reaction mixture comprising a polyisocyanate component, a reactive hydrogen containing component, water and/or organic blowing agents and optionally other auxiliary agents and additives, which process is characterised in that 1. the polyisocyanate component used is a mixture of (a) at least one organic polyisocyanate which is liquid at room temperature and (b) an organic compound which splits off carbon dioxide under the catalytic influence of basic compounds; and 2. the reactive hydrogen component used is a mixture of (c) compounds having molecular weights of from about 62 to about 10,000 which contain reactive hydrogen atoms and (d) a basic compound and/or basic compound chemically built into (c), which basic compound acts as catalyst for the catalytic decomposition of said organic compound (b).

It is preferred to use as compound (b) from about 0.1 to about 5 percent, by weight, based on component (I), of a compound corresponding to the following general formula:

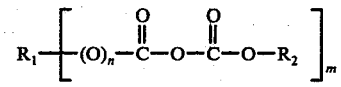

wherein
  $m$ represents 1 or 2,
  $n$ represents 0 or 1 if $m = 1$ and 0 if $m = 2$ and
  $R_1$ represents an m-valent aliphatic hydrocarbon group having from 1 to 18 carbon atoms which may be olefinically unsaturated; a cycloaliphatic hydrocarbon group having from 4 to 10 carbon atoms; an aromatic hydrocarbon group having from 6 to 10 carbon atoms; or an araliphatic hydrocarbon group having from 7 to 10 carbon atoms and
  $R_2$ represents a monovalent hydrocarbon group which has the meaning defined for $R_1$.

The major effect achieved when polyurethane foams are produced by this process is that the flow time, that is to say the difference between the fiber time and the cream time of the foaming process, is substantially increased. This means that during the time that the reaction mixture is foaming, it remains for a longer time in the low viscosity state. By "cream time" is meant the interval of time from mixing of the reactants to the onset of the reaction which brings about formation of the foam. By "fiber time" is meant the interval of time after mixing of the components during which a rod dipped into the foaming reaction mixture forms fibers when pulled out, which is an indication of a steep rise in the viscosity of the reaction mixture due to the setting in of the cross-linking reaction. The increase in flow time observed in the process results in certain advantages. If the reaction mixture remains at a low viscosity state for a longer time during the foaming process, it is more easily able to fill molds without leaving gaps, even those mold with complicated structures. In addition, the vertical density distribution in the foam is more homogenous. In view of this last-mentioned advantage, the process is to be recommended not only for the production of foam products having a dense outer skin, which are particularly preferred for the present invention, but also for the production of any polyurethane foams in closed molds since foam products which have been foamed without restriction by the known process are also often found to have an inhomogenous density distribution.

It has been disclosed, for example, in U.S. Pat. Nos. 3,222,302 and 3,573,232, that compounds of the type which are to be used here may be used as chemical blowing agents for the production of foams. The prior publications, however, give no indication that the advantages of the present process could be achieved. This is particularly true since in the present process, especially in the embodiment where foams with a compact outer skin are produced, the combination of carbonic acid ester anhydrides or mixed anhydrides and basic compounds which bring about their decomposition is not used as a blowing agent, but simply as an additional additive to improve the flow properties of the foamable mixture. The additives which are essential to the present invention would, moreover, be unsuitable as the sole blowing agents, particularly for the production of mold foam products with a compact outer skin, since carbon dioxide does not condense against the cool internal wall of the mold as do organic blowing agents and would therefore not facilitate formation of the desired compact external skin. Finally, there is a fundamental difference between the evolution of carbon dioxide which takes place in the present reaction and the usual evolution of carbon dioxide which takes place in the chemistry of polyurethane foams as a result of a reaction between isocyanate groups and water used as blowing agent. The difference is that in the latter reaction, the isocyanate groups give rise to amino groups which immediately react with excess isocyanate groups, causing an increase in the viscosity of the reaction mixture. It is precisely this increase in viscosity in the initial stage of the reaction which is desired to be prevented. Furthermore, the carbon dioxide liberating reaction which is essential to the present invention takes place much more spontaneously when the components are brought together than the known $NCO/H_2O$ reaction. It is this spontaneity which reduces the cream time so that the flow time may be increased.

It has also been disclosed in U.S. Pat. No. 3,074,894 that certain compounds be used in polyurethane foam making which breakdown during the foaming reaction to form compounds having reactive hydrogen atoms which will react with the polyisocyanate. This reference, however, is not concerned with closed mold foaming, the particular problems associated therewith, nor the advantages of the present process.

The preferred compounds used in the present invention which liberate carbon dioxide under the catalytic influence of basic compounds correspond to the following general formula:

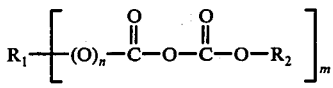

wherein
  $m$ represents 1 or 2 preferably 1,
  $n$ represents 0 or 1 when $m$ = 1 and 0 when $m$ = 2,
  $R_1$ represents an m-valent aliphatic hydrocarbon group having from 1 to 18 and preferably from 1 to 4 carbon atoms which may be olefinically unsaturated; a cycloaliphatic hydrocarbon group having from 4 to 10 and preferably 6 carbon atoms; an aromatic hydrocarbon group having from 6 to 10 preferably 6 carbon atoms; or an araliphatic hydrocarbon group having from 7 to 10 carbon atoms; and
  $R_2$ represents a monovalent hydrocarbon group which conforms to the corresponding definition for $R_1$.

Preferably, $R_1$ represents an aliphatic hydrocarbon group having from 1 to 4 carbon atoms or a phenyl group and $R_2$ an aliphatic hydrocarbon having from 1 to 4 carbon atoms.

The following are examples of such compounds: pyrocarbonic acid dimethyl ester; pyrocarbonic acid diethyl ester; pyrocarbonic acid dibutyl ester; pyrocarbonic acid dioxtadecyl ester; acetic acid-carbonic acid-ethyl ester anhydride; propionic acid-carbonic acid-ethyl ester anhydride; sebacic acid-bis(carbonic acid methyl ester)-anhydride; adipic acid-bis-(carbonic acid methyl ester)-anhydride; crotonic acid-carbonic acid-methyl ester-anhydride and the like. Other suitable compounds corresponding to the above formula have been described in U.S. Pat. Nos. 3,573,232 and 3,222,302. Pyrocarbonic acid diethyl ester is particularly preferred for the process of the present invention. It would theoretically also be possible to use anhydrides of the above-mentioned formula wherein $R_1$ and $R_2$ contain any substituents which are inert in the chemical reactions which take place, e.g. nitro, halogen, cyano or alkoxy substituents.

In the process of the present invention, the anhydrides are preferably added to the polyisocyanate component. These mixtures contain from about 0.1 to about 5, preferably from 0.3 to 2%, by weight, of the above-mentioned anhydrides, based on the pure polyisocyanate component.

The catalyst which brings about decomposition of the anhydrides with evolution of carbon dioxide is preferably added to the component which is reacted with the polyisocyanate for polyurethane formation, i.e. to the polyhydroxyl component. If desired, however, the catalyst may also be used in the form of basic groups built into the polyhydroxyl compound. Mixtures of chemically fixed catalysts with catalysts which are merely present as mixtures may, of course, also be used. The catalysts used may be any inorganic or organic compounds which are basic in reaction, for example, alkali metal hydrodixde or alcoholates, such as sodium hydroxide, potassium hydroxide, sodium ethylene and potassium methylate; and salts which are basic in reaction, e.g. sodium carbonate, potassium orthophosphate and the like. It is particularly preferred, however, to use tertiary amines as basic catalysts. Examples of such tertiary amines include, in particular, the basic amine catalysts known in the chemistry of polyurethane foams, e.g. triethylamine, dimethyl benzylamine, pentamethyl diethylene triamine and triethylene diamine. Among the various compounds which contain chemically fixed basic groups the known amine polyethers should be particularly mentioned. These may be obtained in known manner by alkoxylation of of primary and/or secondary monoamines or polyamines which contain at least two aminic NH-bonds. Examples of such amino polyethers include the ethoxylation and propoxylation products of ammonia, hydrazine, ethylene diamine, propylene diamine, methylamine or, for example, N,N'-dimethyl-ethylene diamine. Analogously constructed alkoxylation products of starter molecules which contain hydroxyl groups and amino groups, for example of diethanolamine or N-methyl dipropanolamine are, of course, also suitable. The quantity of catalyst used in the process of the present invention is not critical and is generally from about 0.001 to about 10%, by weight, of tertiary nitrogen or inorganic base, based on the total quality of reaction mixture.

The polyisocyanates used in the process of the present invention or for the preparation of the mixtures according to the present invention may be any aliphatic, cycloaliphatic, araliphatic, aromatic or heterocyclic polyisocyanates, but they should preferably be liquid at room temperature. Suitable polyisocyanates have been described, for example, by W. Siefken in Justus Liebig's Annalen der Chemie, 562, pages 75–136. The following are examples: ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl cyclohexane (German Auslegeschrift No. 1,202,785, U.S. Pat. No. 3,401,190); hexahydrotolylene-2,4- and 2,6-diisocyanate and mixtures of these isomers; hexahydrophenylene-1,3-and/or -1,4-diisocyanate; perhydrodiphenyl-methane-2,4'-and/or -4,4'-diisocyanate; phenylene-1,3- and -1,4-diisocyanate; tolylene-2,4- and -2,6-diisocyanate and mixtures of these isomers; diphenylmethane-2,4'- and/or -4,4'-diisocyanate; naphthylene-1,5-diisocyanate; triphenylmethane-4,4',4"-triisocyanate; polyphenyl-polymethylene polyisocyanates which may be obtained by aniline/formaldehyde condensation followed by phosgenation and have been described, for example, in British Pat. Nos. 874,430 and 848,671; m- and p-isocyanatophenyl sulphonyl isocyanates according to U.S. Pat. No. 3,454,606; perchlorinated aryl polyisocyanates, for example those described in German Auslegeschrift No. 1,157,601 (U.S. Pat. No. 3,277,138); polyisocyanates containing carbodiimide groups as described in German Pat. No. 1,092,007 (U.S. Pat. No. 3,152,162); the diisocyanates described in U.S. Pat. No. 3,492,330; polyisocyanates containing allophanate groups as described, for example, in British Pat. No. 994,890, Belgian Pat. No. 761,626 and published Dutch Patent Application 7,102,524; polyisocyanates containing isocyanurate groups as described, for example, in U.S. Pat. No. 3,001,973, German Pat. Nos. 1,022,789; 1,222,067 and 1,027,394 and in German Offenlegungsschrifts 1,929,034 and 2,004,048; polyisocyanates containing urethane groups as described, e.g. in Belgian Pat. No. 752,261 or in U.S. Pat. No. 3,394,164; polyisocyanates containing acylated urea groups according to German Pat. No. 1,230,778; polyisocyanates contining biuret groups as described, for example, in German Pat. No. 1,101,394 (U.S. Pat. No. 3,124,605 and 3,201,372) and in British Pat. No. 889,050; polyisocyanates prepared by telomerisation reactions as described, for example, in U.S. Pat. No. 3,654,106; polyisocyanates containing ester groups, such as those mentioned, for example, in British Pat. No. 965,474 and 1,072,956, in U.S. Pat. No. 3,567,763 and in German Pat. No. 1,231,688; reaction products of the above-mentioned isocyanates with acetals according to German Pat. No. 1,072,385; and polymeric polyisocyanates which contain fatty acid groups according to U.S. Pat. No. 3,455,883.

It is preferred to use diphenylmethant diisocyanates containing carbodiimide and/or uretone imine groups, which may be obtained according to German Pat. No. 1,092,007 (U.S. Pat. No. 3,152,162); or polyisocyanates containing urethane groups which may be obtained by reacting 1 mol of 4,4-diisocyanatodiphenylmethane with from 0.05 to 0.3 mol of low molecular weight diols or triols, preferably polypropylene glycols having a molecular weight below 700. Mixtures of the last-mentioned preferred polyisocyanates are also preferred.

The starting components to be used according to the present invention also include compounds containing at least 2 hydrogen atoms which are reactive with isocyanates, generally having a molecular weight of from about 62 to 10,000. Apart from compounds containing amino groups, thiol groups or carboxyl groups, these starting components are preferably polyhydroxyl compounds, in particular compounds containing from 2 to 8 hydroxyl groups, and especially those having a molecular weight of from 200 to 10,000, preferably from 1,000 to 6,000. These include polyesters, polyethers, polythioethers, polyacetals, polycarbonates or polyester amides containing at least 2, generally from 2 to 8 and preferably from 2 to 4 hydroxyl groups, of the type which are known for the production of both homogenous and cellular polyurethanes. It is often advantageous to use the above-mentioned higher molecular weight polyhydroxyl compounds as mixtures with up to 95%, by weight, preferably up to 50% by weight, based on the total quantity of polyhydroxyl compounds, of low molecular weight polyols having molecular weights of from 62 to 200. Low molecular weight polyols of this type include, for example, ethylene glycol, propane-1,2-diol, propane-1,3-diol, butane-1,2-diol, butane-1,4-diol, hexane-1,6-diol, decane-1,10-diol, diethylene glycol, triethylene glycol, tetraethylene glycol, dipropylene glycol, tripropylene glycol, glycerol, trimethylolpropane and the like.

The hydroxyl polyesters used as starting components may be, for example, reaction products of polyhydric alcohols, preferably dihydric alcohols, with the optional addition of trihydric alcohols; and polybasic, preferably dibasic, carboxylic acids. Instead of using free polycarboxylic acids, the corresponding polycarboxylic acid anhydrides or esters of lower alcohols or mixtures thereof may be used for preparing the polyesters. The polycarboxylic acids may be aliphatic, cycloaliphatic, aromatic and/or heterocyclic and may be substituted, for example with halogen atoms, and/or by unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids, such as oleic acid, optionally mixed with monomeric fatty acids; dimethyl terephthalate; and terephthalic acid bis-glycol ester. The polyhydric alcohols which may be used included, for example, ethylene glycol; propylene-1,2- and -1,3-glycol; butylene-1,4- and -2,3-glycol; hexane-1,6-diol; octane-1,8-diol; neopentyl glycol; cyclohexane dimethanol (1,4-bis-hydroxymethyl cyclohexane); 2-methyl-1,3-propane diol; glycerol, tirmethylol propane, hexane-1,2,6-triol; butane-1,2,4-triol; trimethylol ethane; pentaerythritol; quinitol; mannitol and sorbitol; methyl glycoside; diethylene glycol; triethylene glycol; tetraethylene glycol; polyethylene glycols; dipropylene glycol; polypropylene glycols; dibutylene glycol and polybutylene glycols. the polyesters may also contain carboxyl end groups. Polyesters of lactones, such as ε-caprolactone, or hydroxycarboxylic acids, e.g. ω-hydroxycaproic acid, may also be used.

The polyethers with at least two, generally from 2 to 8 preferably 2 or 3 hydroxyl groups which may also be used are of the type which are known and which may be obtained, for example, by the polymerisation of epoxides. These include ethylene oxide, propylene oxide, butylene oxide, tetrahydrofuran, styrene oxide, or epichlorohydrin. The polymerization may occur either each on its own, for example, in the presence of $BF_3$, or by an addition reaction of these epoxides, optionally as mixtures or successively, to starting components which contain reactive hydrogen atoms. These reactive hydrogen containing compounds include alcohols or amines, e.g. water, ethylene glycol, propylene-1,3- or -1,2-glycol, trimethylolpropane, 4,4'-dihydroxy diphenylpropane, aniline, ammonia, ethanolamine or ethylene diamine. Sucrose polyethers which have been described, for example, in German Auslegeschrifts 1,176,358 and 1,064,938 may also be used. It is in many cases preferred to use polyethers which contain predominantly primary OH-groups (up to 90%, by weight, based on all the OH-groups in the polyether). Polyethers modified by vinyl polymers, e.g. the compounds obtained by the polymerization of styrene and acrylonitrile in the presence of polyethers (U.S. Pat. No. 3,383,351; 3,304,273; 3,523,093 and 3,110,695 and German Pat. No. 1,152,536) and polybutadienes which contain OH-groups are also suitable.

Among the polythioethers, the products obtained by the condensation of thioglycol on its own and/or with other glycols, dicarboxylic acids, formaldehyde, aminocarboxylic acids or amino alcohols should be particularly mentioned. The products obtained are polythio mixed ethers, polythio ether esters or polythio ether ester amides, depending on the co-components.

Suitable polyacetals include, the compounds which may be prepared from glycols, such as diethylene glycol, triethylene glycol, 4,4'-dioxethoxydiphenyl dimethylmethane and hexane diol, and formaldehyde. Suitable polyacetals may also be obtained by the polymerisation of cyclic acetals.

The hydroxyl polycarbonates used are known compounds. These include the polycarbonates which may be prepared by the reaction of diols, such as propane-1,3-diol, butane-1,4-diol, and/or hexane-1,6-diol, diethylene glycol, triethylene glycol or tetraethylene glycol; with diaryl carbonates, such as diphenyl carbonate, or phosgene.

Suitable polyester amides and polyamides include the predominantly linear condensates obtained from polybasic saturated and unsaturated carboxylic acids or the anhydrides thereof; and polyvalent saturated and unsaturated amino alcohols, diamines, polyamines and mixtures thereof.

Polyhydroxyl compounds already containing urethane or urea groups and modified or unmodified natural polyols, such as castor oil, carbohydrates or starch, may also be used. Addition products of alkylene oxides and phenolformaldehyde resins or of alkylene oxides and ureaformaldehyde resins are also suitable for the purpose of the present invention.

Representatives of these compounds have been described, for example, in High Polymers, Volume XVI, "Polyurethanes, Chemistry and Technology" by Saunders-Frisch, Interscience Publishers, New York, London, Volume I, 1962, pages 32 – 42 and pages 44 – 54 and Volume II, 1964, pages 5 – 6 and 198 – 199 and in Kunststoff-Handbuch, Volume 7, Vieweg-Hochtlen, Carl-Hanser-Verlag, Munich 1966, e.g. on pages 45 – 71.

The reactants (including water which may be used as blowing agent) are used in proportions corresponding to an isocyanate index of from about 70 to about 800, preferably from 90 to 130. (An isocyanate index of 100 means that the reaction mixture contains equivalent quantities of isocyanate groups and active hydrogen atoms which enter into reaction with these isocyanate groups).

According to the present invention, water may be used as blowing agent, but readily volatile organic substances are preferred. Suitable organic blowing agents include, for example, acetone, ethyl acetate, methanol, ethanol, halogenated alkanes, such as methylene chloride, chloroform, ethylidene chloride, vinylidene chloride, monofluorotrichloromethane, chlorodifluoromethane or dichlorodifluoromethane and butane, hexane, heptane or diethyl ether.

In addition to the catalysts mentioned above for the carbon dioxide forming reaction, other compounds which accelarate the isocyanate addition reaction may also be used. Apart from the basic compounds which have already been mentioned by way of example, there may be used organic metal compounds, in particular organic tin compounds, such as tin-(II)-acetate, tin-(II)-octoate, tin-(II)-ethyl hexoate and tin-(II)-laurate, and the dialkyl tin salts of carboxylic acids, e.g. dibutyl tin diacetate, dibutyl tin dilaurate, dibutyl tin maleate or dioctyl tin diacetate.

The process may also be modified by using compounds which are known to catalyse the trimerisation of isocyanates so that polyurethane foams which contain isocyanurate groups are obtained. It is particularly important in this embodiment of the process that isocyanate indices substantially above 100 be employed because free isocyanate groups are required to be available not only for the reaction with the active hydrogen atoms, but also for trimerization. The trimerization catalysts used may be any compounds which initiate a polymerization reaction of the isocyanate group at room temperature. Such compounds have been described, for example, in French Pat. No. 1,441,565, Belgian Pat. Nos. 723,153 and 723,152 and in German Offenlegungsschrift 2,301,408. They may be, in particular, basic salts, such as sodium acetate or potassium acetate; or mononulcear or mutlinuclear Mannich bases of condensable phenols which are optionally substituted by alkyl, aryl or aralkyl groups; or oxo compounds and secondary amines, especially those in which the oxo compound used is formaldehyde and the secondary amine is dimethylamine. According to IR spectroscopic analyses, varying proportions of carbodiimide structures are generally formed in the foams, depending on the reaction conditions employed, in particular the reaction temperature reached. Their proportion in the foams may be increased by the addition of catalysts which are known for the preparation of carbodiimides, in particular trivalent to pentavalent organic phosphorus compounds, such as phospholines, phospholinophides, tert. phosphines and the like. Further details may be found, e.g. in "Polyurethanes, Chemistry and Technology", Volume I and II, Saunders-Frisch, Interscience Publishers, 1962 and 1964.

The quantity of polymerization catalysts is to a large extent determined by the nature of the catalyst and in some cases the basicity. As a general rule, if isocyanurate formation is desired to take place at the same time the trimerisation catalysts are used in quantities of from about 0.1 to about 10%, by weight, preferably from 0.2 to 5%, by weight, based on the polyisocyanate component.

Other examples of catalysts which may be used in the present invention and details about the action of the catalysts may be found in Kunststoff-Handbuch, Volume VII, published by Vieweg and Hochtlen, Carl-Hanser-Verlag, Munich 1966, e.g. on pages 96 to 102.

The catalysts which accelerate polyurethane formation are generally used in quantities of from about 0.001 to about 10 percent, by weight, based on the quantity of compounds having molecular weights of from about 62 to about 10,000 which contain at least 2 hydrogen atoms capable of reacting with isocyanates.

Surface active additives (emulsifers and foam stabilizers) may also be used in the present invention. Suitable emulsifiers include the sodium salts of ricinoleic sulphonates or of fatty acids or salts of fatty acids with amines, such as oleic acid diethylamine or stearic acid diethanolamine. Alkali metal salts of sulphonic acids, for example of dodecyl benzene sulphonic acid or dinaphtylmethane disulphonic acid; or of fatty acids, such as ricinoleic acid; or of polymeric fatty acids may also be used as surface active additives.

Suitable foam stabilizers are, in particular, water-soluble polyether siloxanes. These compounds generally have a copolymer of ethylene oxide and propylene oxide attached to a polydimethyl siloxane group. Foam stabilizers of this type have been described, for example, in U.S. Pat. No. 2,764,565.

Reaction retarders, e.g. compounds which are acid in reaction, such as hydrochloric acid or organic acid halides; known cell regulators, such as paraffins or fatty alcohols or dimethyl polysiloxanes; pigments; dyes; known flame-retarding agents, such as tris-chlorethyl phosphate or ammonium phosphate and polyphosphate; stabilizers against ageing and weathering; plasticizers; fungistatic and bacteriostatic substances and fillers, such as barium sulphate, kieselguhr, carbon black or whiting, may also be used in the present invention.

Other examples of surface active additives, foam stabilizers, cell regulators, reaction retarders, stabilizers, flame-retarding substances, plasticizers, dyes, fillers and fungistatic and bacteriostatic substances which may be used according to the present invention and details concerning their use and mode of action have been described in Kunststoff-Handbuch, Volume VI, published by Vieweg and Hochtlen, Carl-Hanser-Verlag, Munich 1966, e.g. on pages 103 to 113.

The reaction mixture is introduced into a mold made of a metal, e.g. aluminum, or a synthetic resin material, e.g. an epoxide resin. The reaction mixture foams inside the mold to form the molded product. Foaming in the mold may be carried out produce a molded product having a cellular structure on its surface or it may be carried out to product a product having a compact surface skin and cellular core. The result obtained may be regulated by either introducing just sufficient foamable reaction mixture into the mold to fill the mold when it has foamed or introducing a larger quantity of reaction mixture, in which case the process is said to be carried out under conditions of "overcharging". A procedure of this type has been disclosed, for example, in U.S. Pat. Nos. 3,178,490 and 3,182,104.

Cold setting foams may also be produced according to the present invention (see British Pat. No. 1,162,517 and German Offenlegunsschrift 2,153,086).

When the process of the present invention is employed for producing foams having a compact outer skin, known internal mold-release agents may be used, e.g. those described in U.S. Pat. Nos. 3,925,527, 3,726,952, Belgian Pat. No. 824,872 or in German Offenlegungsschrifts 2,121,670, 2,356,692, 2,363,452 or 2,307,589.

The process of the present invention is preferably carried out by reacting the components by the known one-shot process for which mechanical devices are frequently used, for example those described in U.S. Pat. No. 2,764,565. Processing equipment which may also be used is described in Kunststoff-Handuch, Volume VI, published by Vieweg and Hochtlen, Carl-Hanser-Verlag, Munich 1966, e.g. on pages 121 to 205.

The process may be adjusted to produce hard products for the manufacture of furniture parts, car bodies, technical equipment and structural elements. It may also be adjusted to produce semi-hard to soft products for the manufacture of safety padding in the construction of motor vehicles, elastic shoe soles, bumpers, etc.

EXAMPLE 1

100 parts, by weight, of a polyol mixture having a hydroxyl number of 515, a water content of less than 0.3%, by weight, and a viscosity of 1200 m Pa.s at 25° C, consisting of:

1. 80 parts, by weight, of a polyether having an OH-number of 550 obtained by the addition of ethylene oxide to trimethylolpropane;

2. 19 parts, by weight, of a polyester having an OH-number of 370 obtained by reacting 1 mol of adipic acid, 2.6 mol of phthalic acid anhydride, 1.3 mol of oleic acid and 6.9 mol of trimethylolpropane; and 3. 1 part, by weight, of a polyether having an OH-number of 470 obtained by the addition of ethylene oxide to ethylamine;

0.8 parts, by weight, of a commercial polysiloxane-polyalkylene oxide block copolymer as foam stabilizers; 0.15 parts, by weight, of pentamethyl diethylene triamine as catalyst; 6.0 parts, by weight, of an amidamine oleic acid salt prepared from 1 mol of 3-dimethylamine-propylamine-(1) and 2 mol of oleic acid as internal mold release agent; 0.1 parts, by weight, of aqueous 85% orthophosphoric acid as reaction retarder and 5 parts, by weight, of monofluorotrichloromethane as blowing agent are mixed to form component (A). Component (B) consists of a mixture of 161 parts, by weight, of a polyisocyanate which has been obtained by the phosgenation of aniline/formaldehyde condensates followed by reaction with a mixture of tripropylene and tetrapropylene glycol having an OH-number of 480 and which has a viscosity of 130 m Pa.s at 25° C and an isocyanate content of 28%, by weight; and 2.7 parts, by weight, of pyrocarbonic acid diethyl ester. 112.05 parts, by weight, of component (A) and 163.7 parts, by weight of component (B) are vigorously mixed in a two-component dosing and mixing apparatus. This foamable reaction mixture is immediately introduced through a gating in the lowest point of an upright plate-shaped mold which is maintained at a temperature of 60° C. The molded product obtained in the form of a plate (height = 920 mm, width = 420 mm, thickness = 25 mm) of hard polyurethane integral foam having an average gross density of 390 kg/m$^3$ may be removed after 10 minutes from the mold. The gross density measured at various points in the molded product is found to fall only very slightly in the direction of foaming, in contrast to that of molded foams which have been manufactured without the addition of pyrocarbonic acid diethyl ester in component (B). The individual values measured from below upwards in the direction of foaming at intervals of 100 mm (the figures in brackets are those obtained without the addition of pyrocarbonic acid diethyl ester) are as follows in kg/m$^3$: 399 (448), 395 (431), 393 (420), 392 (411), 392 (410), 391 (400), 388 (381), 382 (359), 381 (340).

EXAMPLE 2

Similar to Example 1, but the average gross density of the molded product is 590 kg/m$^3$. The following density gradient is obtained in the direction of foaming in kg/m³. (the figures in brackets were obtained without the addition of pyrocarbonic acid diethyl ester); 621 (672), 614 (645), 611 (627), 605 (608), 598 (587), 589 (571), 580 (549), 571 (517), 567 (508).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of poylurethane foam in a closed mold by foaming a reaction mixture which comprises a polyisocyanate component, a reactive hydrogen containing component, and an organic blowing agent, wherein
   1. the polyisocyanate component is a mixture comprising
      A. at least one organic polyisocyanate which is liquid at room temperature and
      B. a flow improving organic compound which splits off carbon dioxide under the catalytic influence of basic compounds, said flow improving organic compound being of the formula:

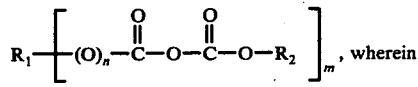
, wherein $m$ represents 1 or 2
   $n$ represents 0 or 1 when $m=1$ and 0 when $m=2$,
   $R_1$ represents an m-valent aliphatic hydrocarbon group having from 1 to 18 carbon atoms, which may be olefinically unsaturated; a cycloaliphatic hydrocarbon group having from 4 to 10 carbon atoms; an aromatic hydrocarbon group having from 6 to 10 carbon atoms; or an araliphatic hydrocarbon group having from 7 to 10 carbon atoms;
   $R_2$ represents a monovalent hydrocarbon group which has the meaning defined for $R_1$, and
   wherein from 0.1 to 5% by weight of said component (B) based on polyisocyanate (A), is used, and
   2. the reactive hydrogen containing component comprises
      C. a compound having a molecular weight of from about 62 to about 10,000 which contains reactive hydrogen atoms and
      D. a basic compound mixed with (C) and/or a basic compound chemically built into (C) which basic compound acts as a catalyst for the catalytic decomposition of said organic compound (B).

2. The process of claim 1, wherein $R_1$ represents an m-valent aliphatic hydrocarbon group having 1 to 4 carbon atoms, a cycloaliphatic hydrocarbon group having six carbon atoms or an aromatic hydrocarbon having 6 carbon atoms.

3. The process of claim 1 wherein said component (B) is pyrocarbonic acid diethyl ester.

4. The process of claim 1 wherein from 0.3 to 2% by weight of said component (B), based on polyisocyanate (A), is used.

5. The process of claim 1 wherein said basic compound (D) is a tertiary amine.

6. The process of claim 1 wherein a trimerization catalyst is used in the foamable reaction mixture and said foamable reaction mixture has an isocyanate index substantially above 100.

* * * * *